(12) United States Patent
Umayahara et al.

(10) Patent No.: US 8,084,151 B2
(45) Date of Patent: Dec. 27, 2011

(54) FUEL CELL SYSTEM AND METHOD THEREFOR

(75) Inventors: Kenji Umayahara, Aichi (JP); Michio Yoshida, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 357 days.

(21) Appl. No.: 12/530,082

(22) PCT Filed: Mar. 7, 2008

(86) PCT No.: PCT/JP2008/054675
§ 371 (c)(1),
(2), (4) Date: Sep. 4, 2009

(87) PCT Pub. No.: WO2008/111654
PCT Pub. Date: Sep. 18, 2008

(65) Prior Publication Data
US 2010/0068577 A1 Mar. 18, 2010

(30) Foreign Application Priority Data
Mar. 7, 2007 (JP) ................................. 2007-057572

(51) Int. Cl.
*H01M 16/00* (2006.01)
(52) U.S. Cl. ............................... 429/50; 429/52; 429/61
(58) Field of Classification Search .................. None
See application file for complete search history.

(56) References Cited

U.S. PATENT DOCUMENTS
6,399,231 B1 * 6/2002 Donahue et al. ............. 429/431
2004/0219399 A1 * 11/2004 Zhu et al. ....................... 429/13

FOREIGN PATENT DOCUMENTS

| | | |
|---|---|---|
| JP | 11-345624 A | 12/1999 |
| JP | 2001-85037 A | 3/2001 |
| JP | 2002-500421 A | 1/2002 |
| JP | 2003-504807 A | 2/2003 |
| JP | 2003-536232 A | 12/2003 |
| JP | 2005-346979 A | 12/2005 |
| WO | 2006/046684 A2 | 5/2006 |
| WO | 2006-073545 A1 | 7/2006 |
| WO | WO 2007/063783 A1 | 6/2007 |

OTHER PUBLICATIONS

Machine Translation of JP 2005-346979 cited by Applicant in the IDS of May 25, 2011.*

* cited by examiner

*Primary Examiner* — Patrick Ryan
*Assistant Examiner* — Wyatt McConnell
(74) *Attorney, Agent, or Firm* — Kenyon & Kenyon LLP

(57) ABSTRACT

When an output voltage of a fuel cell is lowered to carry out a catalyst activation process so as to activate a catalyst during an intermittent operation of the fuel cell, if generated power P1 exceeds allowed battery charge power, while generated power P2 does not exceed the allowed battery charge power, then low speed corresponding to the generated power P2 is selected and the output voltage of the fuel cell is decreased toward a target voltage on the basis of the low speed, which has been selected, thereby restraining sudden generation of surplus power caused by a reduction in the output voltage of the fuel cell. By the control described above, a voltage reduction speed of a fuel cell is determined according to a receiving capability of an object which receives surplus power generated by the fuel cell during the catalyst activation process of the fuel cell.

14 Claims, 5 Drawing Sheets

FUEL CELL SYSTEM AND METHOD THEREFOR

This is a 371 national phase application of PCT/JP2008/054675 filed 7 Mar. 2008, which claims priority to Japanese Patent Application No. 2007-057572 filed 7 Mar. 2007, the contents of which are incorporated herein by reference.

TECHNICAL FIELD

The present invention relates to a fuel cell system and more particularly to a fuel cell system capable of decreasing an output voltage of a fuel cell when carrying out a catalyst activation process.

BACKGROUND ART

Hitherto, in a fuel cell system, adsorption of oxygen into a catalyst layer of a fuel cell in operation causes a drop in an output voltage of the fuel cell. In such a case, a process for activating the catalyst layer of a fuel cell stack (i.e., reduction process) is carried out by interrupting the supply of oxygen to the fuel cell and decreasing the power generation voltage of the fuel cell down to a reduced zone of the catalyst layer.

As a technique related to such a catalyst activation process of a fuel cell, there has been proposed, for example, a technique wherein a low-voltage battery is used for an auxiliary device constituting a hybrid fuel cell, and surplus power which increases as voltage decreases during the catalyst activation process of the fuel cell is charged in the battery so as to obviate wasting surplus power (the publication of Japanese Patent Application Laid-Open No. 2005-346979).

DISCLOSURE OF INVENTION

However, the conventional technique does not give consideration to determining the voltage decreasing speed of a fuel cell while giving consideration to surplus power of the fuel cell when carrying out the catalyst activation process of the fuel cell. Hence, there have been cases where an inconvenience results when activating a catalyst layer of the fuel cell. For example, increasing the fuel cell voltage reduction speed in order to finish the catalyst activation process in shorter time causes a sudden voltage drop in a state wherein there is a plenty of a residual gas (oxygen). Hence, the amount of surplus power increases and excessive power is supplied accordingly. As a result, there has been a danger of causing deteriorated performance, such as deteriorated durability, of a load of the fuel cell or a battery (electric storage device).

Accordingly, the present invention has been made with a view of the problem with the prior art described above, and an object thereof is to determine a voltage reduction speed of a fuel cell according to the receiving capability a device receiving surplus power generated by a fuel cell during a catalyst activation process of the fuel cell.

To this end, a fuel cell system in accordance with the present invention is a fuel cell system which reduces an output voltage of a fuel cell to carry out a catalyst activation process, comprising a controller which changes an output voltage changing speed of the fuel cell for the catalyst activation process according to a receiving capability of a device which receives surplus power generated by the fuel cell.

With this arrangement, when the catalyst activation process is carried out, the controller calculates a receiving capability (e.g., the power which can be charged into an electric storage device and/or power which can be consumed by a load), and controls the output voltage changing speed of the fuel cell for the catalyst activation process according to the receiving capability, thus restraining the occurrence of surplus power which may adversely affect a receiving device.

For instance, the receiving device is at least one of an electric storage device and a load of the fuel cell. The electric storage device is constructed to be capable of being charged with surplus power, and a load (e.g., auxiliary devices; such as a hydrogen pump, a compressor, and a coolant pump, or a traveling motor or the like) is constructed to be capable of consuming surplus power, thus becoming the one which is capable of receiving surplus power generated during the catalyst activation process. However, the receiving devices are not limited thereto; any other devices may be the receiving devices as long as they are capable of being charged with power or of consuming power.

The fuel cell system in accordance with the present invention is further equipped with a voltage converter which changes an output voltage of the fuel cell and charges surplus power generated by the fuel cell into the receiving device. Further, when carrying out the catalyst activation process, the controller calculates the receivable power of the receiving device and limits the output voltage changing speed of the fuel cell in the voltage converter as the calculated power that can be received is small.

With this arrangement, when carrying out the catalyst activation process, as the power which can be received is small, that is, as the receivable power of a receiving device, which is an object receiving surplus power generated by a fuel cell, is smaller, the output voltage changing speed (changing rate) of a fuel cell is limited (restrained/reduced), thereby restraining sudden occurrence of surplus power attributable to a reduction in an output voltage of the fuel cell. Thus, even if the receivable power of a receiving device becomes smaller, the occurrence of surplus power generated is decreased as the output voltage changing speed of the fuel cell is decreased and therefore will not exceed the receiving capability (the receivable power) of the receiving device. This restrains a peak value of surplus power from increasing, adversely affecting the receiving device.

To constitute the fuel cell system, the following elements may be added.

Preferably, the controller limits the output voltage changing speed of the fuel cell within a range in which the power passing through the voltage converter does not exceed an upper limit value of the voltage converter.

With this arrangement, as the output voltage of the fuel cell decreases, the surplus power generated by the fuel cell comes to pass through the voltage converter, and the output voltage changing speed of the fuel cell is limited within the range in which the passing power does not exceed the upper limit value (permissible value) of the voltage converter, thus making it possible to protect the voltage converter from influences (such as heat) caused by the surplus power passing therethrough.

Preferably, the controller stops an operation for lowering the output voltage of the fuel cell to a voltage suited to the catalyst activation process when the calculated power which can be received is smaller than predetermined set power.

With this arrangement, if calculated power which can be received is smaller than set power which has been specified beforehand, then it is determined that a receiving device is unable to receive surplus power and control is carried out to stop the voltage lowering operation by the voltage converter, thus making it possible to protect the receiving device.

Preferably, as the receiving device, an auxiliary device of the fuel cell is further provided, and the controller drives the auxiliary device as a load of the fuel cell if the calculated power which can be received is smaller than predetermined set power.

With this arrangement, if calculated power which can be received is smaller than the set power specified beforehand, then it is determined that the electric storage device or a load of the fuel cell is unable to receive surplus power, and the additional auxiliary device is driven so as to allow surplus power to be consumed by the auxiliary device. This makes it possible to prevent the electric storage device from being overcharged and also to increase the voltage reduction speed, as compared with the case where the auxiliary device is not driven.

Further, a fuel cell system in accordance with the present invention is a fuel cell system which reduces an output voltage of a fuel cell when carrying out a catalyst activation process, comprising: power calculating means which calculates power which can be received by at least one of an electric storage device and a load of the fuel cell which will be an object receiving surplus power generated by the fuel cell; and voltage conversion controlling means which controls a voltage converter which changes an output voltage of the fuel cell on the basis of the receivable power calculated by the power calculating means, wherein the voltage conversion controlling means limits the output voltage changing speed of the fuel cell as the receivable power calculated by the power calculating means is smaller.

With this arrangement, when the catalyst activation process is carried out, as the receivable power calculated by the power calculating means is smaller, that is, as the receivable power of at least one of the electric storage device and a load of the fuel cell, which will be an object receiving surplus power generated by the fuel cell, is smaller, the output voltage changing speed of the fuel cell is limited so as to restrain sudden generation of surplus power caused by a reduction in the output voltage of the fuel cell. Thus, even if the receivable power of at least one of the load of the fuel cell and the electric storage device becomes small, surplus power is gradually generated as the output voltage changing speed of the fuel cell decreases and surplus power will not exceed the receiving capability (the receivable power) of the load of the fuel cell or the electric storage device. This makes it possible to restrain a peak value of surplus power from increasing, adversely affecting the load of the fuel cell or the electric storage device. Further, when the surplus power generated by the fuel cell is charged into the electric storage device as the output voltage of the fuel cell decreases, the output voltage changing speed of the fuel cell is limited within the range in which the passing power which passes through the voltage converter does not exceed the upper limit (permissible value) of the voltage converter, thus making it possible to protect the voltage converter from influences (such as heat) caused by surplus power passing therethrough.

A control method of a fuel cell in accordance with the present invention is a control method of a fuel cell system which lowers an output voltage of a fuel cell when carrying out a catalyst activation process, comprising: a step for calculating the power which can be received by a receiving device which receives surplus power generated by the fuel cell; and a step for changing an output voltage of the fuel cell on the basis of a calculated power which can be received, wherein the step for changing the output voltage of the fuel cell limits the output voltage changing speed of the fuel cell as the calculated power which can be received is smaller.

BEST MODE FOR CARRYING OUT THE INVENTION

The following will describe a fuel cell system in accordance with an embodiment of the present invention with reference to the accompanying drawings. In the present embodiment, the description will be given to an example wherein the present invention has been applied to a vehicle-mounted power generation system of a fuel cell vehicle.

(Explanation of Configuration)

First, by referring to FIG. 1, the configuration of a fuel cell system 1 in accordance with the embodiment of the present invention will be described.

Figure 1:
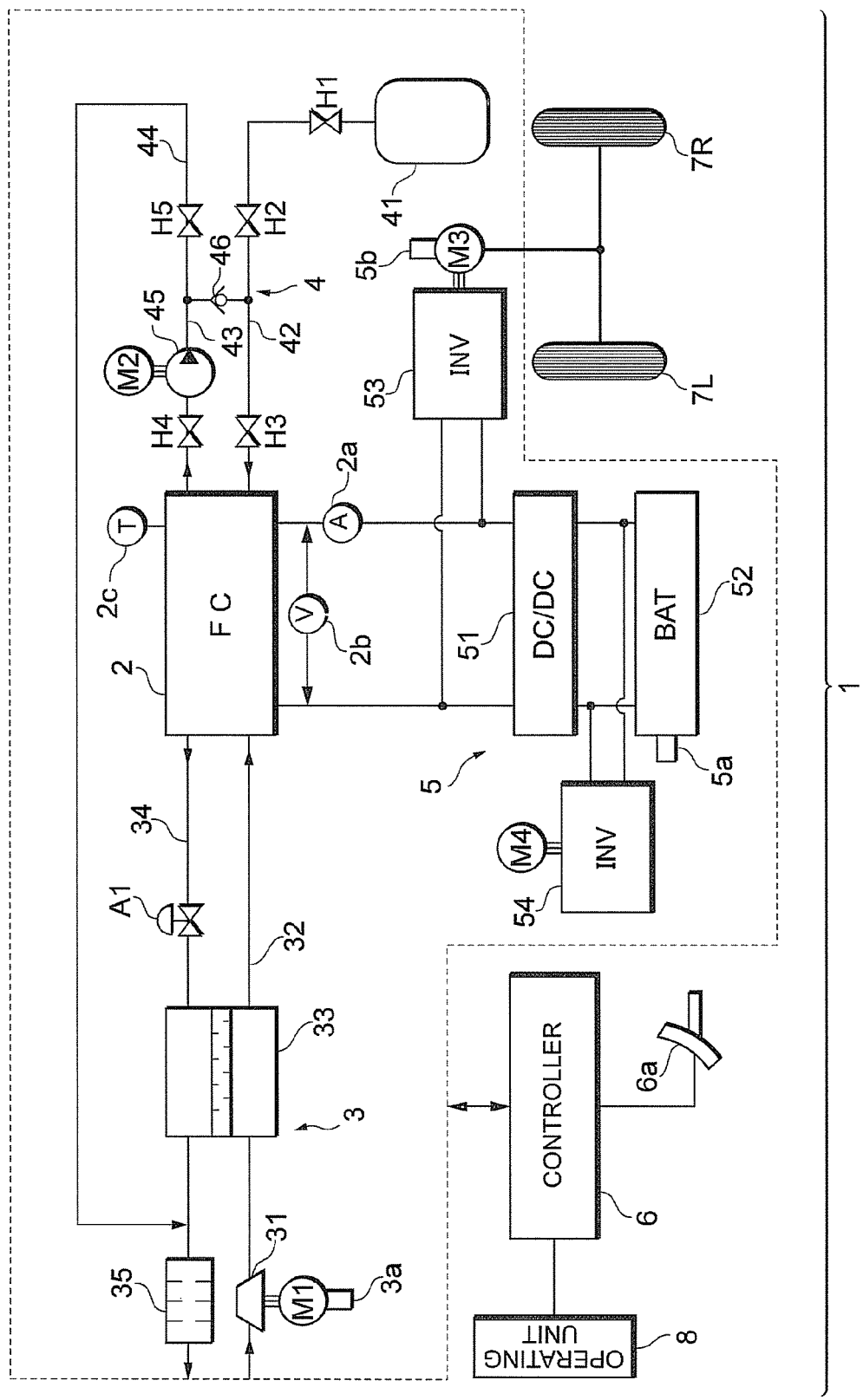
FIG. 1: It is a system block diagram of a fuel cell system illustrating an embodiment of the present invention.

As illustrated in FIG. 1, the fuel cell system 1 according to the present embodiment is equipped primarily with a fuel cell 2 which carries out power generation by receiving supplied reactant gases (an oxidizing gas and a fuel gas) and generates power by the power generation, an oxidizing gas piping system 3 which supplies air as the oxidizing gas to the fuel cell 2, a fuel gas piping system 4 which supplies a hydrogen gas as the fuel gas to the fuel cell 2, a power system 5 which charges/discharges power of the system, and a controller 6 which integrally controls the entire system.

The fuel cell 2 is composed of, for example, a polymer electrolyte type and equipped with a stack structure having multiple layered electric cells (cells). Each of the electric cells of the fuel cell 2 has a cathode electrode (air electrode) on one surface of an electrolyte formed of an ion-exchange membrane and an anode electrode (fuel electrode) on the other surface, and an electrode which includes the cathode electrode and the anode electrode uses, for example, a porous carbon material as a base and platinum Pt as a catalyst (electrode catalyst). The electric cell further has a pair of separators sandwiching the cathode electrode and the anode electrode from both sides. The fuel gas is supplied to a fuel gas passage of one separator, while the oxidizing gas is supplied to an oxidizing gas passage of the other separator. The fuel cell 2 generates power from the supplied gases. The fuel cell 2 is provided with a current sensor (current detecting means) 2a which detects current being generated (output current), a voltage sensor (voltage detecting means) 2b which detects a voltage (output voltage), and a temperature sensor (temperature detecting means) 2c which detects the temperature of the fuel cell 2. The fuel cell 2 may come in a various types, including a phosphoric acid type or a molten carbonate type, in addition to the polymer electrolyte type.

The oxidizing gas piping system 3 primarily has an air compressor 31, an oxidizing gas supply flow path 32, a humidifying module 33, a cathode off gas flow path 34, a diluter 35, and a motor M1 which drives the air compressor 31.

The air compressor 31 is driven by a driving force of the motor M1 operated by a control command of the controller 6, and supplies oxygen (oxidizing gas) taken in from open air through an air filter, which is not shown, to the cathode electrode of the fuel cell 2. The motor M1 is equipped with a revolution speed detection sensor 3a which detects the revolution speed of the motor M1. The oxidizing gas supply flow path 32 is a gas passage for leading the oxygen supplied from the air compressor 31 to the cathode electrode of the fuel cell 2. A cathode off gas is emitted from the cathode electrode of the fuel cell 2. The cathode off gas contains pumping hydrogen or the like generated on the cathode electrode, in addition to an oxygen off gas after being subjected to a cell reaction of the fuel cell 2. The cathode off gas is in a high-humidity state, because it contains the moisture produced from the cell reaction of the fuel cell 2.

The humidifying module 33 exchanges moisture between the oxidizing gas in a low-humidity state which flows through the oxidizing gas supply flow path 32 and the cathode off gas in the high-humidity state which passes through the cathode off gas flow path 34, thereby appropriately humidifying the oxidizing gas supplied to the fuel cell 2. The cathode off gas flow path 34 is a gas passage for discharging the cathode off gas out of the system, an air regulator A1 being provided in the vicinity of a cathode electrode outlet of the gas passage. The back-pressure of the oxidizing gas supplied to the fuel cell 2 is regulated by the air regulator A1. The diluter 35 dilutes the discharge concentration of the hydrogen gas to a preset concentration range (e.g., a range established on the basis of an environmental standard). The diluter 35 is in communication with the downstream of the cathode off gas flow path 34 and the downstream of an anode off gas flow path 44, which will be discussed hereinbelow, and a hydrogen off gas and an oxygen off gas are mixed and diluted by the diluter 35 before they are discharged out of the system.

The fuel gas piping system 4 mainly has a fuel gas supply source 41, a fuel gas supply flow path 42, a fuel gas circulation flow path 43, the anode off gas flow path 44, a hydrogen circulating pump 45, a check valve 46, and a motor M2 for driving the hydrogen circulating pump 45.

The fuel gas supply source 41 is a fuel gas supplying means which supplies a fuel gas, such as a hydrogen gas, to the fuel cell 2, and is constructed of, for example, a high-pressure hydrogen tank or a hydrogen storage tank. The fuel gas supply flow path 42 is a gas flow path for leading a fuel gas discharged from the fuel gas supply source 41 to the anode electrode of the fuel cell 2, and the gas flow path is provided with valves, such as a tank valve H1, a hydrogen supply valve H2, and an FC inlet valve H3 from an upstream to a downstream. The tank valve H1, the hydrogen supply valve H2, and the FC inlet valve H3 are shut valves for supplying (or cutting off) a fuel gas to the fuel cell 2, and these valves are composed of, for example, solenoid valves.

The fuel gas circulation flow path 43 is a return gas flow path for refluxing an unreacted fuel gas to the fuel cell 2, and the gas flow path is provided with an FC outlet valve H4, a hydrogen circulating pump 45, and a check valve 46, respectively, from the upstream to the downstream. A low-pressure unreacted fuel gas discharged from the fuel cell 2 is appropriately pressurized by the hydrogen circulating pump 45 driven by a driving force of the motor M2 operated by a control command of the controller 6, and led to the fuel gas supply flow path 42. The back-flow of the fuel gas from the fuel gas supply flow path 42 to the fuel gas circulation flow path 43 is restrained by the check valve 46. The anode off gas flow path 44 is a gas flow path for exhausting an anode off gas, which contains a hydrogen off gas discharged from the fuel cell 2, out of the system, and the gas flow path is provided with a purge valve H5.

The power system 5 is provided primarily with a high-voltage DC/DC converter 51, a battery 52, a traction inverter 53, an auxiliary inverter 54, a chopper circuit 55, an absorber 56, a traction motor M3, and an auxiliary motor M4.

The high-voltage DC/DC converter 51 is a DC voltage converter and has a construction corresponding to the voltage converter in the present invention. The high-voltage DC/DC converter 51 has a function which regulates a DC voltage input from the battery 52 connected to the primary and outputs the regulated voltage to the traction inverter 53 connected to the secondary, and a function which regulates a DC voltage input from the fuel cell 2 or the traction motor M3 connected to the secondary and outputs the regulated voltage to the battery 52 connected to the primary. These functions of the high-voltage DC/DC converter 51 implement the charging/discharging of the battery 52. The high-voltage DC/DC converter 51 is capable of maintaining and fixing a terminal voltage of the secondary on the basis of a control signal from the controller 6, and the high-voltage DC/DC converter 51 is constructed so as to arbitrarily control the output voltage of the fuel cell 2. Further, the high-voltage DC/DC converter 51 is constructed so as to be also capable of arbitrarily controlling the passing power from the primarily to the secondary or the passing power from the secondary to the primary on the basis of a control signal from the controller 6.

The battery 52 is a chargeable/dischargeable secondary cell and composed of various types of secondary cells, such as a nickel hydride battery. The battery 52 may be charged with surplus power or supply auxiliary power under the control by a battery computer, which is not shown. A part of DC power generated by the fuel cell 2 is boosted or stepped down by the high-voltage DC/DC converter 51 and charged into the battery 52. The battery 52 is provided with a SOC sensor 5a which detects the state of charge (SOC: State of Charge) of the battery 52. In place of the battery 52, a chargeable/dischargeable electric storage device other than the secondary cell, e.g., a capacitor, may be adopted.

The traction inverter 53 and the auxiliary inverter 54 are PWM inverters of the pulse-width modulation type. These inverters convert DC power output from the fuel cell 2 or the battery 52 into three-phase AC power and then supply the three-phase AC power to the traction motor M3 and the auxiliary motor 4 according to a supplied control command. The traction motor M3, which corresponds to a part of the load in the present invention, is a motor for driving wheels 7L and 7R (vehicle driving motor) and it is an embodiment of a load motive power source. The traction motor M3 is provided with a revolution speed detection sensor 5b which detects the number of revolutions thereof. The auxiliary motor M4, which corresponds to a part of the load in the present invention, is a motor for driving various auxiliary devices, and generically refers to M1 which drives the air compressor 31, the motor M2 which drives the hydrogen circulation pump 45, and the like.

The controller 6, which is constituted primarily of a CPU, a ROM, and a RAM, relates to the controller in the present invention. The controller 6 integrally controls each section of the system on the basis of input sensor signals. Specifically, the controller 6 calculates the required output power of the fuel cell 2 on the basis of sensor signals sent out from an accelerator (gas) pedal sensor 6a which detects the movement of the accelerator (gas) pedal, the SOC sensor 5a, revolution speed detection sensors 3a and 5b, the current sensor 2a, the voltage sensor 2b, the temperature sensor 2c, and the like. At this time, the controller 6 determines whether there is an output request from the traction motor M3 on the basis of a signal sent out from an operating unit 8 constituted mainly of a shift lever for selecting the operation mode of the traction motor M3 (P: parking mode; R: reverse mode; N: neutral mode; D: drive mode; and B: regenerative braking mode).

Then, the controller 6 controls the output voltage and the output current of the fuel cell 2 to generate output power based on the required output power. Further, the controller 6 controls output pulses and the like of the traction inverter 53 and the auxiliary inverter 54 to control the traction motor M3 and the auxiliary motor M4.

Further, adsorption of oxygen to the catalyst layer of the fuel cell 2 causes the output voltage of the fuel cell 2 to fall, so that the controller 6 interrupts the supply of oxygen to the fuel cell 2 and lowers the power generation voltage of the fuel cell 2 to the reduced zone of the catalyst layer so as to carry out the reduction process or refresh process for activating the catalyst layer.

(Description of Principle)

Figure 2:
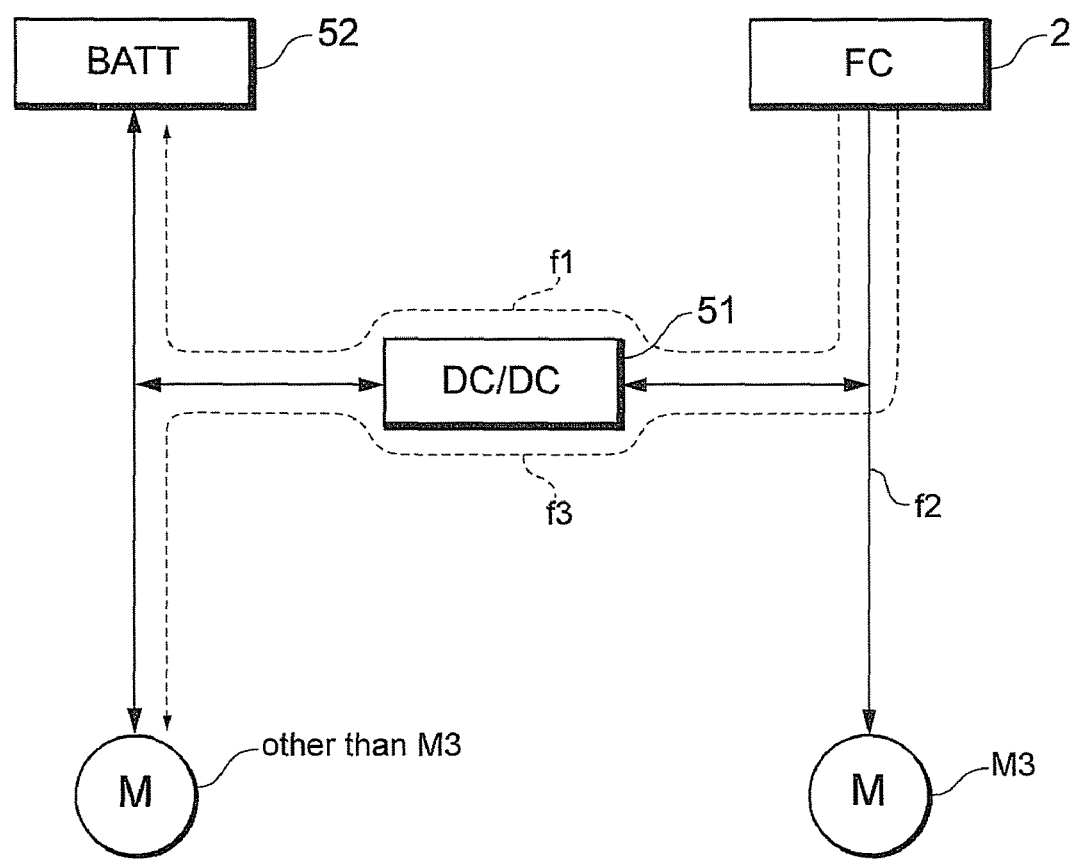
FIG. 2: It is an explanatory diagram of the principle of the present invention, illustrating the flow of surplus power.

Referring now to FIG. 2, the principle of operation in the present embodiment will be described.

Continued use of the fuel cell 2 oxidizes the electrode catalyst with resultant deteriorated power generation efficiency, so that the catalyst activation process is regularly carried out. The catalyst activation process is carried out by reducing the output voltage of the fuel cell 2 to a voltage level at which the electrode catalyst develops a reductive reaction, and it is also called a reduction process or a refresh process. It is preferred that the catalyst activation process is carried out in a stabilized state wherein the required power amount of the system is small and no power is required to be supplied directly to the traction motor M3 from the fuel cell 2. For example, the catalyst activation process is preferably carried out in a so-called intermittent drive mode in which a vehicle is traveling from only the power supplied from the battery 52.

During the catalyst activation process, the output voltage of the fuel cell 2 is lowered by reducing the secondary terminal voltage of the high-voltage DC/DC converter 51. Here, the output current of the fuel cell 2 increases as the output voltage of the fuel cell 2 reduces because of the current-voltage characteristic (I-V characteristic) which the fuel cell 2 intrinsically has, thus causing the output power of the fuel cell 2 to increase. The catalyst activation process is carried out basically in the state wherein required power to the system is small, such as in the intermittent drive mode, so that most of the increased output power of the fuel cell will inconveniently become surplus power.

Therefore, as indicated by a flow f1 of power in FIG. 2, the surplus power produced as the output voltage of the fuel cell 2 reduces is charged into the battery 52 through the intermediary of the high-voltage DC/DC converter 51. The amount of the surplus power tends to increase as the reduction speed (reduction rate) of the output voltage of the fuel cell 2 increases.

Conventionally, the high-voltage DC/DC converter 51 has been controlled at a predetermined reduction speed of the output voltage of the fuel cell 2. As long as the battery 52 is chargeable, there is no need for considering the reducing speed of the output voltage of the fuel cell 2. However, there is a case where surplus power cannot be received by the battery 52 alone. For example, there is a case where the battery 52 has been charged to a certain level, leaving a less amount of power which can be charged therein (the power which can be charged).

To deal with the aforesaid case, according to the present invention, the capability of a receiving device, such as the battery 52, for receiving surplus power is detected, and the output voltage changing speed of the fuel cell 2 for the catalyst activation process is changed and controlled. More specifically, the tendency that the amount of surplus power generated decreases as the output voltage changing speed of the fuel cell 2 decreases is utilized, and control is carried out such that the reduction speed of the output voltage of the fuel cell 2 is decreased (the reducing rate is decreased) if the receiving capability of a device which receives surplus power, such as the battery 52, is low.

However, it is not appropriate to set a low changing speed of the output voltage of the fuel cell 2 from the beginning. A low reducing speed of the output voltage of the fuel cell 2 means a longer time required for the output voltage to reach the reduced zone of the electrode catalyst. The intermittent drive mode during which the catalyst activation process is carried out is enabled only in a stable vehicle traveling state; therefore, if, for example, the accelerator (gas) pedal 6a or the like is operated and the amount of load is increased, then the intermittent drive mode has to be temporarily cleared. Meanwhile, in order to adequately implement the catalyst activation process, it is necessary to quickly lower the output voltage of the fuel cell to a voltage in the reduced zone and maintain the voltage for a predetermined period of time. Hence, it is necessary to lower the output voltage of the fuel cell to an output voltage in the reduced zone as quickly as possible so as not to cause the catalyst activation process to be cleared, and also necessary to maintain the voltage for predetermined time. For this reason, it is preferable for the system to carry out dynamic control such that the output voltage of the fuel cell 2 is lowered at a reasonable speed and the output voltage reduction speed is temporarily decreased only if a special situation, such as a case where generated surplus power cannot be charged or consumed, takes place.

Here, if the battery 52 does not have an allowance to receive all surplus power of the fuel cell 2, then the surplus power is consumed by a load device. Such a load device may be the traction motor M3 or other auxiliary devices M (the compressor M1, the hydrogen pump M2, and the auxiliary device M4 (air conditioner or the like)), which are loads of the fuel cell 2. If the amount of power which can be charged into the battery 52 is small, then it is possible to use the aforesaid loads of the fuel cell 2.

In a state wherein the traction motor M3 can be driven as the load of the fuel cell 2, surplus power which cannot be charged into the battery 52 may be consumed by driving the traction motor M3 which consumes relatively large power. The surplus power is consumed as indicated by a flow f2 of power illustrated in FIG. 2.

Meanwhile, the case where the traction motor M3 is driven means a situation in which the advancing state of the vehicle is influenced, so that the traction motor M3 cannot be a receiving device which is always available. If the power which can be received by the battery 52 is a predetermined set power level or less and the traction motor M3 cannot consume surplus power, then it is possible for an auxiliary device M other than the traction motor M3 to consume the surplus power. More specifically, the surplus power of the fuel cell 2 is consumed by the auxiliary device M according to a flow f3 of power illustrated in FIG. 2.

Further, if the power which can be charged makes the battery 52 simply not adequate as an object for receiving surplus power of the fuel cell 2, then stopping the catalyst activation process is a conceivable method. This is because, if the catalyst activation process is interrupted and the output voltage of the fuel cell 2 is set back to an original high potential avoiding voltage, then surplus power will not be generated.

Meanwhile, if surplus power is charged in the battery 52 (the case of f1) or consumed by the auxiliary device M (the case of f3), then the surplus power passes through the high-voltage DC/DC converter 51. If the power passing through the high-voltage DC/DC converter 51 becomes excessive, then there will be influences, such as the heat generation of elements, so that the passing power is generally restricted. In the present embodiment, therefore, the controller 6 restricts the output voltage changing speed of the fuel cell 2 so as to prevent the power passing through the high-voltage DC/DC converter 51 from exceeding an upper limit value known beforehand. If the power passing through the high-voltage DC/DC converter 51 reaches the upper limit value or more, then the reduction speed of the output voltage of the fuel cell 2 is eased off even if the battery 52 has an allowance in its power charge capability or the auxiliary device M has an allowance in its power consuming capability. The processing described above reduces the generation of surplus power, that is, the power passing through the high-voltage DC/DC converter 51, thereby protecting the elements of the converter.

Figure 6:
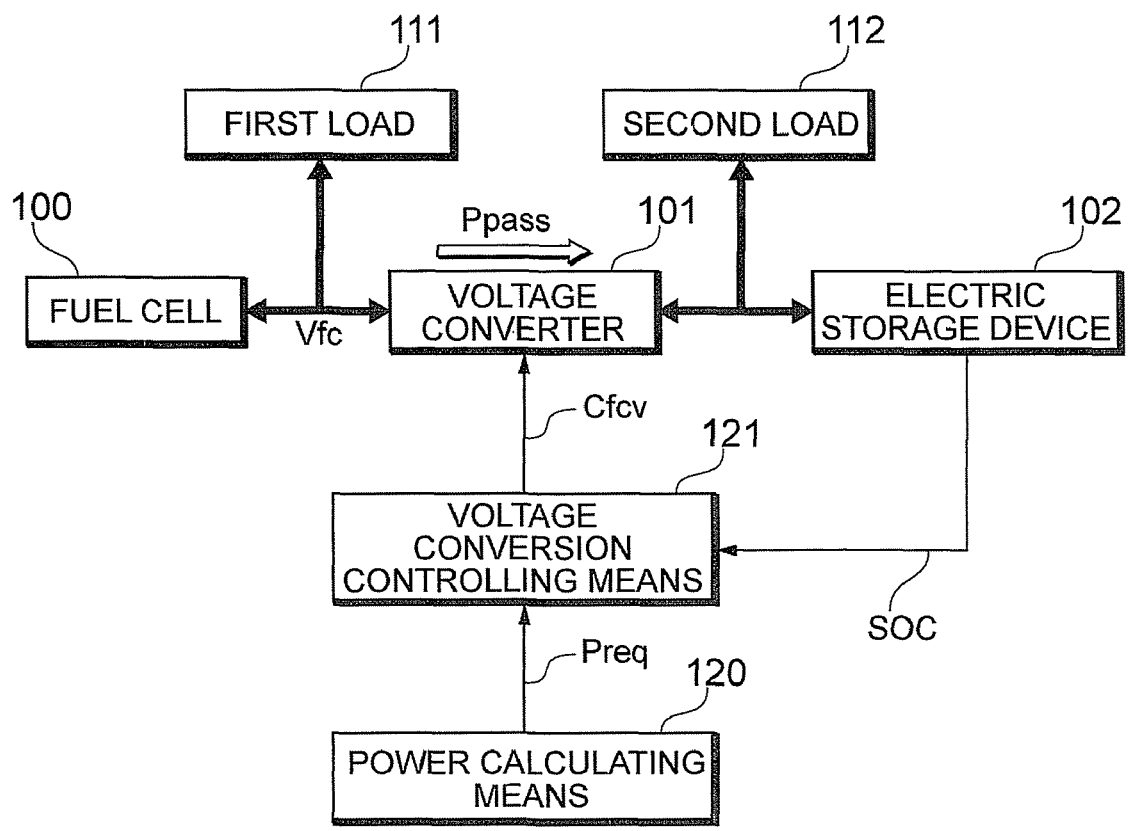
FIG. 6: It is a functional block diagram of the present invention.

FIG. 6 is a functional block corresponding to the aforesaid principle of the present invention.

As illustrated in FIG. 6, the fuel cell system in accordance with the present invention has a fuel cell 100 and an electric storage device 102 connected via a voltage converter 101. A first load 111 is connected to the secondary to which the fuel cell 100 of the voltage converter 101, and a second load 112 is connected to the primary to which the electric storage device 102 of the voltage converter 101 is connected.

The fuel cell 100 corresponds to the fuel cell 2 of the embodiment, the voltage converter 101 corresponds to the DC/DC converter 51, and the electric storage device 102 corresponds to the battery 52, respectively. Further, the first load 111 is a load consuming relatively large power, such as the traction motor M3, while the second load 112 is a load consuming relatively small power, such as the auxiliary motor M4. Whether the first load 111 and the second load 112 are to be connected to the primary or the secondary of the voltage converter 101 may be determined for each system.

The fuel cell system is further equipped with a power calculating means 120 and a voltage conversion controlling means 121. Here, the power calculating means 120 and the voltage conversion controlling means 121 correspond to the controller 6 which receives detection signals from various sensors and controls the system.

The power calculating means 120 is a functional block which calculates receivable power Pa of a device receiving the surplus power generated by the fuel cell 100 (e.g., one or more of the electric storage device 102, the first load 111, and the second load 112 in FIG. 6). The receivable power Pa may be determined on the electric storage device 102 by referring to, for example, a SOC signal or the like indicating the state of charge, on the first load 111 by, for example, checking whether the operation of the first load 111 is an enabled operation mode (the intermittent operation mode or the like) or by referring to the power consumption of the first load 111.

The voltage conversion controlling means 121 is a functional block which controls, by means of a control signal Cfcv or the like, the voltage converter 101 which changes the output voltage of the fuel cell 100 on the basis of the receivable power Pa calculated by the power calculating means 120.

Here, as a first function, the voltage conversion controlling means 121 carries out control such that the changing speed of an output voltage Vfc of the fuel cell is decreased as the receivable power Pa calculated by the power calculating means 120 is smaller. In other words, the output voltage reduction rate of the fuel cell 100 is changed on the basis of the receivable power Pa of the fuel cell 100.

As a second function, the voltage conversion controlling means 121 may stop the operation for lowering the output voltage Vfc of the fuel cell 100 to a voltage suited for the catalyst activation process if the calculated receivable power Pa is smaller than predetermined set power Pth2. This is an extended version of the first function described above.

As a third function, the voltage conversion controlling means 121 may limit the changing speed of the output voltage Vfc of the fuel cell 100 within a range in which power Ppass passing through the voltage converter 101 does not exceed an upper limit value Pmax of the voltage converter 101.

As a fourth additional function, the voltage conversion controlling means 121 may drive the second load 112 if the calculated receivable power Pa is smaller than predetermined set power Pth1.

Incidentally, the receivable power Pa involves one or more of the electric storage device 102, the first load 111, and the second load 112, so that it may be calculated by totaling all the power which can be charged in the electric storage device 102 and the power consumed by the first load 111 and the second load 112. However, surplus power is consumed by normally being charged in the electric storage device 102, so that the receivable power Pa may be calculated as the power itself that can be charged into the electric storage device 102. In the following embodiment, the description will be given, assuming that the receivable Pa is the power which can be charged into the electric storage device 102 (the battery 52).

(Description of Operation)

Figure 3:
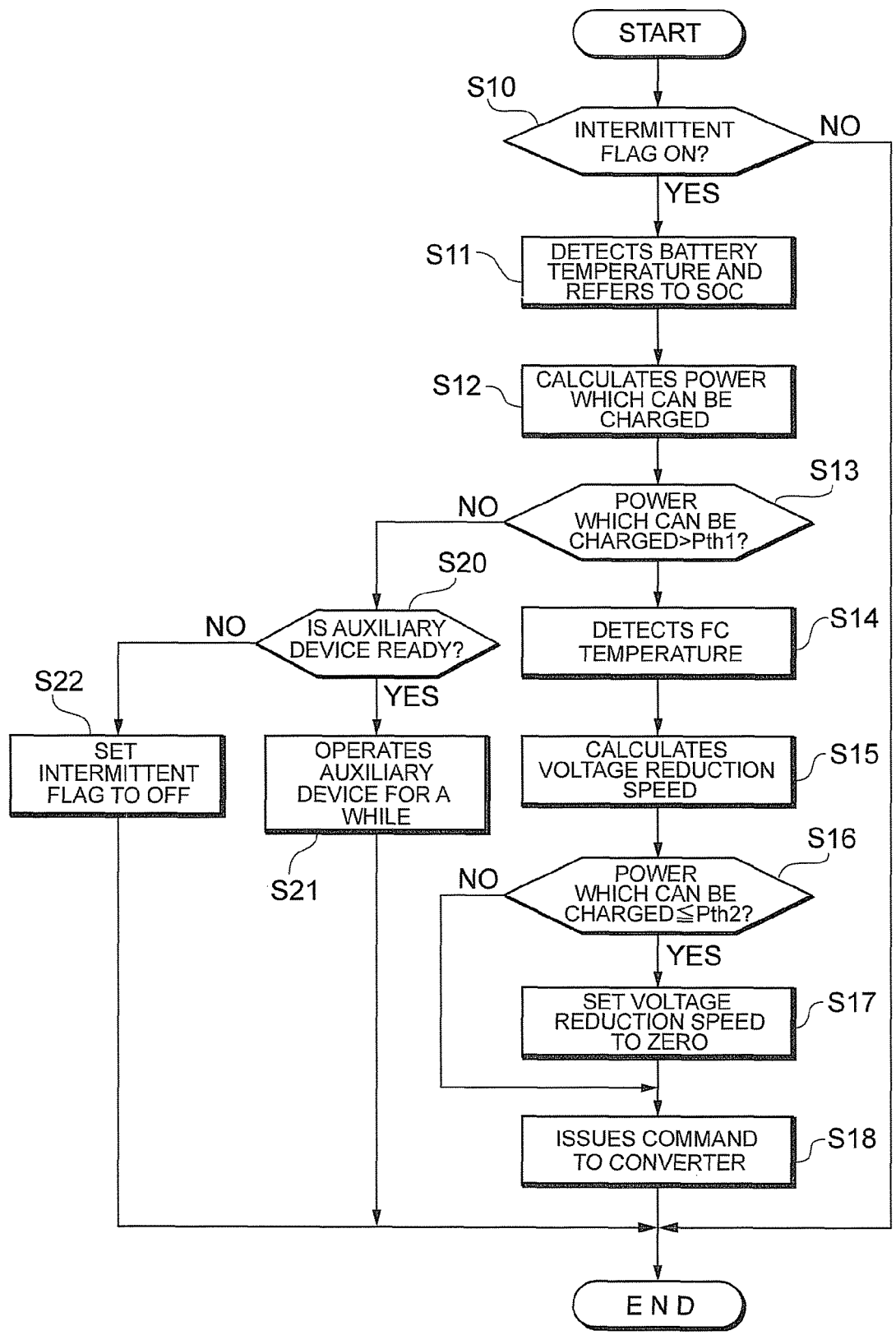
FIG. 3: It is a flowchart illustrating an operation of the embodiment of the present invention.

Referring now to the flowchart of FIG. 3, the operation of the present embodiment will be described.

When the load state of the vehicle has become stable and can be driven from the power supplied from the battery 52 alone, the intermittent drive mode is engaged, causing an intermittent flag to turn ON. In step S10, the controller 6 determines whether the intermittent flag is ON. If it is determined in step S10 that the intermittent flag is ON (YES), then the controller 6 proceeds to step S11 in which the controller 6 detects the internal temperature of the battery 52 on the basis of a SOC signal from the SOC sensor 5a and acquires a SOC value, i.e., the state of charge, of the battery 52. All power that can be charged in the battery may be determined on the basis of the battery temperature, and the charge amount at the present point can be grasped from the SOC value, so that the power that can be charged in the battery thereafter can be calculated if the battery temperature and the SOC value are known. Hence, the controller 6 proceeds to step S12 to calculate the power that can be charged into the battery 52 on the basis of the battery temperature and the SOC value.

Subsequently, the controller 6 proceeds to step S13 to determine whether the calculated power which can be charged into the battery 52 is larger than the preset threshold value power Pth1. The threshold value power Pth1 may be set at a certain value which makes it possible to determine an insufficient charge allowance of the battery 52. The charge allowance degree depends also on the magnitude of surplus power, so that the threshold value power Pth1 may be also dynamically changed and set on the basis of surplus power which can be separately calculated in step S14 or the like.

In step S13, if the power which can be charged into the battery 52 is the threshold value power Pth1 or more (YES), then the controller 6 proceeds to step S14 to measure the internal temperature of the fuel cell 2 by referring to a detection signal from the temperature sensor 2c.

Subsequently, the controller 6 proceeds to step S15 to determine the reduction speed of the output voltage of the fuel cell 2 on the basis of the fuel cell temperature. The generation amount of surplus power is known to change according to the internal temperature of the fuel cell 2. The controller 6 experimentally determines beforehand appropriate voltage reduction speeds associated with internal temperatures of the fuel cell 2 and stores them in the form of a reference table. The reference table is created by, for example, mapping a relationship between output voltage reduction speeds which do not cause excessive generation of surplus power and fuel cell temperatures. The controller 6 takes an internal temperature of the fuel cell 2 as an input value and refers to the reference table to read a voltage reduction speed, which is an output value. The voltage reduction speed may be recorded as, for example, a voltage reduction amount from the last time at each predetermined control timing.

Here, the aforesaid first function of the controller 6 carries out the calculation for easing off the voltage reduction speed on the basis of the generation amount of the aforesaid surplus power in association with the power that can be charged into the battery 52. More specifically, the controller 6 refers to a SOC signal or the like indicating the state of charge of the battery 52 to calculate the power that can be charged into the battery 52, and carries out the calculation for easing off the voltage reduction speed according to the magnitude thereof. As the power that can be charged (the receivable power Pa) becomes larger, more surplus power can be charged, so that a higher voltage reduction speed may be set. For instance, if the gradient coefficient of a standard voltage reduction speed is denoted as $-k1$, then the gradient coefficient after the easing off may be represented as, for example, $-k1 \cdot k2 (0 \leq k2 < 1: k2 \propto Pa)$.

Subsequently, the controller 6 proceeds to step S16 to determine whether the power which can be charged into the fuel cell 2 is the predetermined threshold value power Pth2 or less. The threshold value power Pth2 is appropriate power for easing off the reduction speed of the output voltage of the fuel cell 2, and the Pth2 is reasonably set to be higher the aforesaid threshold value power Pth1 at which the auxiliary device M must be actuated to handle surplus power or the system must be stopped; however, the Pth2 is not limited thereto.

In step S16, if the power which can be charged is the threshold value power Pth2 or less (YES), then the controller 6 proceeds, as the aforesaid second function, to step S17 to stop the voltage reduction process calculated in step S15. For example, if the voltage reduction speed is calculated as a tilt of a voltage reduction straight line, then the coefficient of the tilt is set to zero. In step S16, if the power which can be charged is larger than the threshold value power Pth2 (NO), then the controller 6 determines that there is a sufficient allowance and does not stop the voltage process.

In step S18, the controller 6 outputs to the high-voltage DC/DC converter 51 a control signal for maintaining a present output voltage value of the fuel cell 2 based on the determined voltage reduction speed at a voltage of the secondary. Repeating the process at each given control timing, that is, implementing the control flowchart at each control timing causes the output voltage of the fuel cell 2 to reduce at a voltage reduction speed based on the power which can be charged into the battery 52.

During the voltage reduction period, the controller 6 preferably monitors the power Ppass passing through the DC/DC converter 51. If the passing power Ppass exceeds an upper limit value Pmax of the passing power which has been preset to protect the converter, then the controller 6 implements the aforesaid third function to ease off the voltage reduction speed. The easing-off speed may be considered in the same manner as that for step S17.

Meanwhile, in step S13, if the power which can be charged into the battery 52 is the threshold value power Pth1 or less (NO), then it indicates that charging the battery 52 with surplus power is impossible. Therefore, the controller 6 proceeds to step S20 to implement the aforesaid fourth function thereof whereby to determine whether the auxiliary devices M are in an enabled state, and if the auxiliary devices M are in the enabled state (YES), then the controller 6 proceeds to step S21 to operate the auxiliary devices M for certain time. This process causes the surplus power to be consumed by the auxiliary devices M.

Incidentally, the auxiliary devices M include the compressor M1, the hydrogen pump M2, and an auxiliary device M4 (air conditioner or the like), so that each of the auxiliary devices is determined whether it is in an enabled state, and only auxiliary devices that are in the enabled state can be selected and operated. Since the traction motor M3 consumes large power, if surplus power can be supplied to the traction motor M3, then the surplus power can be supplied to the traction motor M3. If surplus power is insufficient as the driving power of the traction motor M3, then control can be carried out to supply power which makes up for the deficiency to the traction motor M3 from the battery 52.

In step S20, if none of the auxiliary devices M are enabled or only small power, as compared with surplus power, can be consumed (NO), then the controller 6 decides that it is no longer possible to continue the voltage reduction and no longer possible to continue the catalyst activation process, and proceeds to step S22 to switch the intermittent flag to OFF. When the intermittent flag is reset, even if the process is called for next time, the determination result in step S10 will be NO, and the catalyst activation process will not be carried out until the timing for the next intermittent drive mode comes and the intermittent flag is set.

In the process described above, the first function has set the reasonable voltage reduction speed at the beginning, and the second function has stopped the voltage reduction operation, depending on whether the power which can be charged into the battery 52 is the threshold value power Pth2 or less. Alternatively, however, the voltage reduction speed may be continuously changed according to changes in the power which can be charged during the voltage reduction process. This is because the power which can be charged indicates an allowance power that can be supplied to the battery 52 and changes with the elapse of time, so that dynamically changing the voltage reduction speed according to the changes therein permits control with better trackability.

Figure 4:
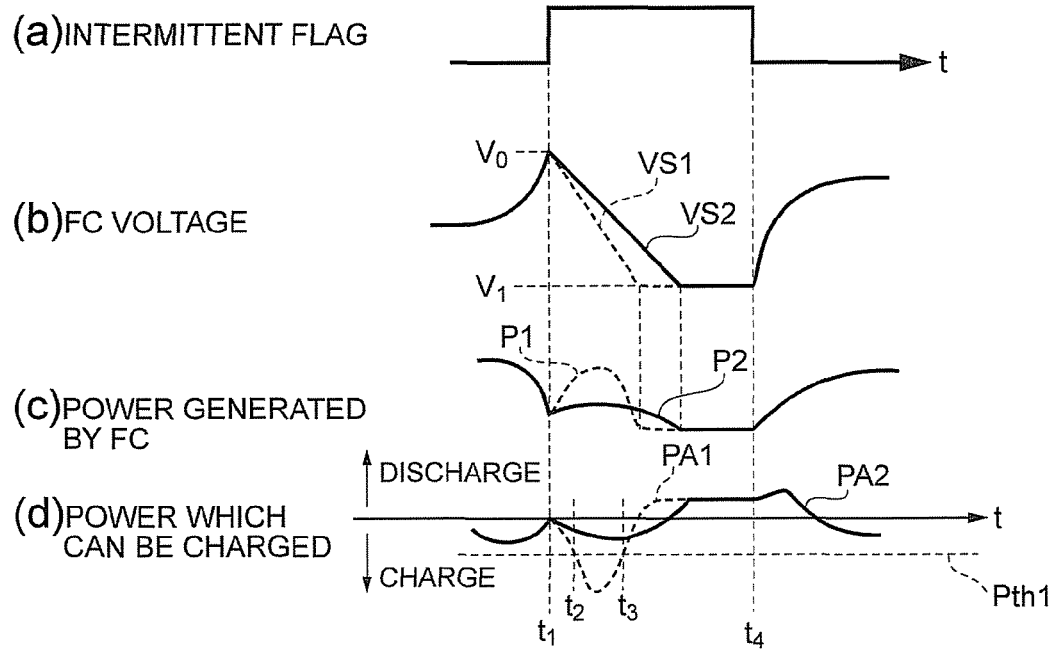
FIG. 4: It is a waveform chart for explaining the operation of the embodiment of the present invention.

FIG. 4 illustrates the waveforms of sections of the system controlled by applying the present embodiment.

FIG. 4(*a*) illustrates a state wherein the intermittent flag, which validates the intermittent drive mode regularly implemented by the controller 6, has been set.

FIG. 4(*b*) illustrates changes in output voltage of the fuel cell 2 controlled by the high-voltage DC/DC converter 51 under the control in the present embodiment. A case where the power that can be charged into the battery 52 is large and the voltage reduction speed can be set to a relatively high speed is denoted by a voltage reduction characteristic VS1, while a case where the power which can be charged is small and the voltage reduction speed has to be set at a relatively low speed is denoted by a voltage reduction characteristic VS2. A voltage V0 denotes a high potential avoiding voltage in a normal drive mode, and a voltage V1 denotes a target reduction voltage providing a target of the catalyst activation process.

FIG. 4(*c*) illustrates the output power characteristic of the fuel cell 2. The calculation may be accomplished from an I-V characteristic or from an output current indicated by a detection signal of the current sensor 2*a* and an output voltage indicated by a detection signal of the voltage sensor 2*b*. Power P1 denotes generated power (surplus power) of fuel cell when the voltage is reduced by the voltage reduction characteristic VS1, and power P2 denotes generated power (surplus power) of the fuel cell when the voltage is reduced by the voltage reduction characteristic VS2.

FIG. 4(d) illustrates the power which can be charged into the battery 52. PA1 denotes the power which can be charged in the case of the voltage reduction characteristic VS1, and PA2 denotes the power which can be charged in the case of the voltage reduction characteristic VS2.

As illustrated in FIG. 4(a), if the intermittent flag for carrying out the intermittent operation of the fuel cell 2 is set at timing t1, then the controller 6 lowers the output voltage of the fuel cell 2 and starts the catalyst activation process to activate a catalyst. At this time, the high-voltage DC/DC converter 51 specifies the voltage reduction characteristic VS1 which depends on the receivable power Pa of the battery 52 at that time, starting from the high potential avoiding voltage (standby voltage) V0 toward the target reduction voltage (voltage suited for the catalyst activation process) V1.

Here, as the first function, the controller 6 changes the voltage reduction speed such that the voltage reduction speed decreases as the power which can be charged into the battery 52 decreases, thereby setting a voltage. reduction characteristic with a gentle slope like the voltage reduction characteristic VS2.

The voltage reduction characteristic VS1 has a steeper voltage reduction slope than the voltage reduction characteristic VS2 does, so that the generation amount of surplus power is larger when the voltage reduction characteristic VS1 is selected than when the voltage reduction characteristic VS2 is selected, as illustrated in FIG. 4(c).

Here, the surplus power is sequentially charged into the battery 52 according to the flow of f1 in FIG. 2, so that the power which can be charged into the battery decreases as the charge amount increases, as illustrated in FIG. 4(d).

When the threshold value power Pth1 is reached at time t2, the aforesaid steps S20 and S21 are implemented, and the controller 6 starts driving the traction motor M3 or the auxiliary devices M on the basis of the aforesaid fourth function. If the surplus power cannot be consumed by these load devices, then the controller 6 carries out the aforesaid step S22 to interrupt the catalyst activation process.

As the amount of surplus power decreases with the oxidizing gas process or as the power is consumed by the load devices, the power which can be charged into the battery 52 increases accordingly, as indicated by PA1. Then, when the threshold value power Pth1 is exceeded at time t3, the drive of the load devices is stopped.

When the output voltage of the fuel cell 2 reaches the target catalyst voltage V1 and voltage reduction stops, the surplus power is no longer generated, so that the battery 52 enters a discharging zone and power consumption begins. At this time, an electrochemical reaction proceeds in the reduction zone at the electrodes of the fuel cell 2, so that the oxidized electrode catalyst is reduced and activated.

When the intermittent flag is reset at time t4, the catalyst activation is stopped, and the output voltage of the fuel cell 2 increases toward the high potential avoiding voltage V0, as illustrated in FIG. 4(b).

Figure 5:
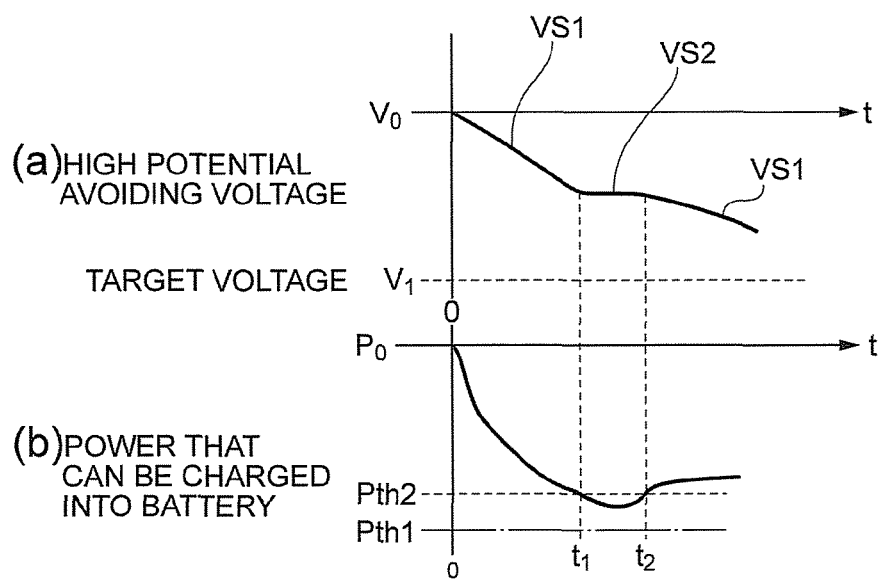
FIG. 5: It is a waveform chart for explaining another operation of the embodiment of the present invention.

FIG. 5 illustrates the waveforms observed in the case where the reduction speed of the output voltage of the fuel cell 2 is changed during the catalyst activation process.

As illustrated in FIG. 5(a), when the intermittent flag is set to ON, the controller 6 controls the high-voltage DC/DC converter 51 to lower the output voltage of the fuel cell 2 by the voltage reduction characteristic VS1 from the high-potential avoiding voltage (standby voltage) V0 toward a target voltage (a voltage suited for the catalyst activation process) V1. At this time, based on the power which can be charged into the battery 52, the controller 6 may ease off the voltage reduction characteristic according to the first function.

As illustrated in FIG. 5(b), in the case where the power which can be charged into the battery 52 exceeds the threshold value voltage Pth2 at the timing t1, the controller 6 controls the high-voltage DC/DC converter 51 according to the second function to change the gradient coefficient of the voltage reduction speed to the voltage reduction characteristic VS2 which is smaller than that of the voltage reduction characteristic VS1 (including zero). Thereafter, if the power charged into the battery 52 decreases below the threshold value Pth2 at the timing t2, then the output voltage reduction speed is returned to the original voltage reduction characteristic VS1 and the output voltage of the fuel cell 2 is reduced toward the target voltage V1 by the voltage reduction characteristic VS1.

Thus, by controlling the voltage reduction speed of the output voltage of the fuel cell 2 such that the power which can be charged in the battery 52 leads to a fastest voltage reduction speed, it is possible to quickly lower the output voltage of the fuel cell 2 to the target reduction voltage V1 and to protect the battery 52 from overcharge.

In the voltage reduction process, if the power Ppass passing through the DC/DC converter 51 exceeds the upper limit value of the high-voltage DC/DC converter 51 or threshold value power Pmax, which is slightly larger than the upper limit value of the high-voltage DC/DC converter 51, then the third function of the controller 6 may carry out control so as to change the output voltage reduction speed to the voltage reduction characteristic VS2, which is slower than the voltage reduction characteristic VS1, and thereafter, return the output voltage reduction speed to the original reduction characteristic VS1 when the passing power Ppass has reached the upper limit value or less of the high-voltage DC/DC converter 51.

In this case, the reduction speed of the output voltage of the fuel cell 2 is restricted such that a fastest reduction speed is obtained within a range in which the passing power for charging the battery 52 with the surplus power generated by the fuel cell 2 does not exceed the upper limit value Pmax of the high-voltage DC/DC converter 51. This makes it possible to quickly lower the output voltage of the fuel cell 2 to the target voltage V1 and to protect the high-voltage DC/DC converter 51 from damage caused by excessive passing power.

(Advantages of the Embodiment)

Thus, according to the present embodiment described above, based on the first function, the changing speed of the output voltage of the fuel cell 2 has been limited as the receivable power Pa (the power that can be charged into the battery 52 in the embodiment) determined by comprehensively considering the power that can be charged into the battery 52 and/or the power that can be consumed by loads decreases during the catalyst activation process, thus making it possible to restrain sudden occurrence of surplus power caused by a reduction in the output voltage of the fuel cell 2. Hence, control is carried out such that even when the chargeable power of the battery 52 decreases, the output voltage changing speed of the fuel cell 2 decreases accordingly. Thus, the generation amount of surplus power decreases accordingly, so that the surplus power will not exceed the power which can be charged in the battery 52. This makes it possible to prevent damage to the battery 52.

Further, according to the aforesaid embodiment, when the value of the power that can be charged into the battery 52 is smaller than set power, the controller 6 may cause the DC/DC converter 51 to stop (including the case of easing off) the operation for reducing the output voltage of the fuel cell 2 to a voltage suited to the catalyst activation process by using the second function. In this case, it is determined that the battery 52 does not have the capability of receiving surplus power and the process of reducing the voltage reduction speed or the process of voltage reduction by the DC/DC converter 51 is stopped, thus allowing the battery 52 to be protected from overcharge.

Further, according to the present embodiment, based on the third function, the controller 6 restricts the reduction speed of the output voltage of the fuel cell 2 such that a fastest reduction speed is obtained within a range in which the passing power for charging the battery 52 with the surplus power generated by the fuel cell 2 does not exceed the upper limit value Pmax of the high-voltage DC/DC converter 51 during the catalyst activation process. This also makes it possible to protect the high-voltage DC/DC converter 51 from damage attributable to excessive passing power.

Further, according to the embodiment, when the value of the power that can be charged into the battery 52 is small, the controller 6, based on the fourth function, drives auxiliary devices as loads of the fuel cell 2 during the catalyst activation process. Hence, by making auxiliary devices consume surplus power, auxiliary device loss can be increased, overcharge of the battery 52 can be prevented, and the voltage reduction speed of the fuel cell 2 can be made faster as compared with the case where no auxiliary devices are driven.

As described above, according to the invention of the present application, the receivable power is comprehensively considered to dynamically control the voltage reduction speed, making it possible to protect the high-voltage DC/DC converter 51 from damage caused by excessive power passing therethrough, protect the battery 52 from overcharge, and set a fastest voltage reduction speed within a permissible range, thus permitting a prompt catalyst activation process to be achieved.

The invention claimed is:

1. A fuel cell system that reduces an output voltage of a fuel cell to carry out a catalyst activation process, comprising:
    a controller that changes a changing speed of the output voltage of the fuel cell for the catalyst activation process according to a receiving capability of a receiving device of surplus power generated by the fuel cell.

2. The fuel cell system according to claim 1, wherein the receiving device is at least one of an electric storage device and a load of the fuel cell.

3. The fuel cell system according to claim 1, further comprising:
    a voltage converter that changes the output voltage of the fuel cell and charges surplus power generated by the fuel cell into the receiving device,
    wherein at the time of the catalyst activation process, the controller
    calculates a receivable power of the receiving device, and limits the changing speed of the output voltage of the fuel cell in the voltage converter as the calculated receivable power is smaller.

4. The fuel cell system according to claim 3, wherein the controller limits the changing speed of the output voltage of the fuel cell within a range in which the passing power of the voltage converter does not exceed an upper limit value of the voltage converter.

5. The fuel cell system according to claim 1, wherein the controller stops an operation for lowering the output voltage of the fuel cell to a voltage suited to the catalyst activation process in the case where the receivable power that has been calculated is smaller than predetermined set power.

6. The fuel cell system according to claim 2, further comprising an auxiliary device of the fuel cell as the receiving device, wherein
    the controller drives the auxiliary device as a load of the fuel cell in the case where the receivable power which has been calculated is smaller than predetermined set power.

7. A fuel cell system which reduces an output voltage of a fuel cell to carry out a catalyst activation process, comprising:
    power calculating device that calculates receivable power of a receiving device of surplus power generated by the fuel cell; and
    voltage conversion controlling device that controls a voltage converter which changes an output voltage of the fuel cell on the basis of the receivable power calculated by the power calculating device,
    wherein the voltage conversion controlling device limits the changing speed of the output voltage of the fuel cell as the receivable power calculated by the power calculating device is smaller.

8. The fuel cell system according to claim 7, wherein the voltage conversion controlling device limits the changing speed of the output voltage of the fuel cell within a range in which power passing through the voltage converter does not exceed an upper limit value of the voltage converter.

9. The fuel cell system according to claim 7, wherein the power conversion controlling device stops an operation for decreasing the output voltage of the fuel cell to a voltage suited to the catalyst activation process in the case where the receivable power that has been calculated is smaller than predetermined set power.

10. The fuel cell system according to claim 7, further comprising an auxiliary device of the fuel cell as the receiving device, wherein
    the power conversion controlling device drives the auxiliary device as a load of the fuel cell in the case where the receivable power that has been calculated is smaller than predetermined set power.

11. A control method of a fuel cell system which decreases an output voltage of a fuel cell to carry out a catalyst activation process, comprising:
    calculating receivable power of a receiving device of surplus power generated by a fuel cell; and
    changing an output voltage of the fuel cell on the basis of the calculated receivable power, wherein
    when changing the output voltage of the fuel cell,
    the changing speed of the output voltage of the fuel cell is decreased as the calculated receivable power is smaller.

12. The control method of a fuel cell system according to claim 11, wherein when changing the output voltage of the fuel cell,
    the changing speed of the output voltage of the fuel cell is limited within a range in which passing power of the receivable power in the voltage converter does not exceed an upper limit value of the voltage converter.

13. The control method of a fuel cell system according to claim 11, wherein when changing the output voltage of the fuel cell,
    an operation for decreasing the output voltage of the fuel cell to a voltage suited to the catalyst activation process is stopped in the case where the receivable power that has been calculated is smaller than predetermined set power.

14. The control method of a fuel cell system according to claim 11, wherein when changing the output voltage of the fuel cell, the auxiliary device is driven as a load of the fuel cell in the case where the receivable power that has been calculated is smaller than predetermined set power.

* * * * *

UNITED STATES PATENT AND TRADEMARK OFFICE
CERTIFICATE OF CORRECTION

PATENT NO. : 8,084,151 B2
APPLICATION NO. : 12/530082
DATED : December 27, 2011
INVENTOR(S) : Kenji Umayahara et al.

It is certified that error appears in the above-identified patent and that said Letters Patent is hereby corrected as shown below:

On the Title Page, Column 1:

Change Item "(75) Inventors: Kenji Umayahara, Aichi (JP); Michio Yoshida, Aichi (JP)"

To Item --(75) Inventors: Kenji Umayahara, Nishikamo-gun (JP); Michio Yoshida, Nishikamo-gun (JP)--.

Signed and Sealed this
First Day of January, 2013

David J. Kappos
*Director of the United States Patent and Trademark Office*